United States Patent
Schmidt et al.

(10) Patent No.: US 7,503,310 B2
(45) Date of Patent: Mar. 17, 2009

(54) PACKAGING ARRANGEMENT FOR AN INCREMENT POSITION SENSOR

(75) Inventors: Jeremy Schmidt, Chatham (CA); Jeremy Drew, Windsor (CA)

(73) Assignee: Continental Automotive Canada, Inc., Chatham, Ontario (CA)

( * ) Notice: Subject to any disclaimer, the term of this patent is extended or adjusted under 35 U.S.C. 154(b) by 528 days.

(21) Appl. No.: 11/384,580

(22) Filed: Mar. 20, 2006

(65) Prior Publication Data

US 2006/0213484 A1    Sep. 28, 2006

Related U.S. Application Data

(60) Provisional application No. 60/663,666, filed on Mar. 21, 2005.

(51) Int. Cl.
*F02D 11/10* (2006.01)

(52) U.S. Cl. ........................ 123/399; 123/337

(58) Field of Classification Search ............... 123/399, 123/361, 337
See application file for complete search history.

(56) References Cited

U.S. PATENT DOCUMENTS

| 3,736,806 | A  | * | 6/1973  | Banks    | ............ | 74/336 R |
| 4,506,217 | A  |   | 3/1985  | Rothley  |              |          |
| 6,382,195 | B1 |   | 5/2002  | Green et al. |          |          |
| 6,532,841 | B2 |   | 3/2003  | Medico et al. |         |          |
| 6,874,468 | B2 | * | 4/2005  | Watanabe | ............ | 123/377  |
| 6,973,917 | B2 | * | 12/2005 | Shimada  | ............ | 123/399  |
| 2006/0202677 | A1 | * | 9/2006 | Schmidt  | ............ | 324/207.2 |

* cited by examiner

*Primary Examiner*—Hieu T Vo

(57) ABSTRACT

An engine actuator includes a sensor assembly driven by an electric motor through a worm gear. An output gear is also driven by the electric motor about an axis transverse to the electric motor output shaft. A bearing located between the actuator housing and the output gear shaft limits gear shake of the output gear during operation of the engine actuator. A coupling mounted on the output gear shaft outside the actuator housing limits axial movement of the output gear shaft.

19 Claims, 3 Drawing Sheets

PACKAGING ARRANGEMENT FOR AN INCREMENT POSITION SENSOR

REFERENCE TO RELATED APPLICATION

The present invention claims the benefit of U.S. Provisional Patent Application No. 60/663,666, filed Mar. 21, 2005.

BACKGROUND OF THE INVENTION

This invention generally relates to an engine actuator. More particularly, this invention relates to the engine actuator including an incremental position sensor.

Intake manifolds control airflow into a vehicle engine to modify engine performance. Engine actuators are used to control valves within the intake manifold. The valves modify air flow characteristics to enhance engine performance in terms of either fuel economy or torque output. A sensor measures the rotational position of an engine actuator output shaft to determine the position and speed of the valves. The position information is sent to an engine controller which uses the information to adjust the valves.

The engine actuator, including the sensor assembly needs to fit within the engine compartment adjacent to the intake manifold. However, the engine actuator package size and arrangement is limited due to the constricted area that is available. Additionally, any arrangement for the engine actuator must provide support for both the sensor assembly and an output gear. The output gear must also be limited in movement to control gear shake. Typically movement of the output gear is limited by supporting an output gear shaft with bearings at several locations along a support shaft for the output gear. However, the smaller packaging arrangement limits space within the engine actuator for multiple bearings.

It is therefore desirable to develop and design an improved arrangement for an engine actuator which provides a smaller packaging size while providing support for an output gear.

SUMMARY OF THE INVENTION

An example engine actuator assembly includes a position sensor and an output gear for driving a valve plate.

The example engine actuator includes the sensor assembly connected through a worm gear and an output gear connected through a gear train. A circuit board is mounted to an actuator housing and contains two Hall Effect sensors and a microcontroller. As the output shaft rotates a Hall Effect sensor senses rotation indicative of the rotational position of the output shaft and thereby the engine actuator. Because the Hall Effect sensors are arranged parallel to the motor output shaft less packaging room is required.

The output gear is also supported by the actuator housing. The output gear rotates about an axis transverse to the motor output shaft. A bearing located between the actuator housing and the output gear shaft limits gear shake of the output gear during operation of the engine actuator. A coupling mounted on the output gear shaft outside the actuator housing limits axial movement of the output gear shaft toward the inside of the housing.

These and other features of the present invention can be best understood from the following specification and drawings, the following of which is a brief description.

BRIEF DESCRIPTION OF THE DRAWINGS

FIG. 2b is a front view of the example sensor assembly of FIG. 2a.

DETAILED DESCRIPTION OF THE PREFERRED EMBODIMENT

Figure 1:
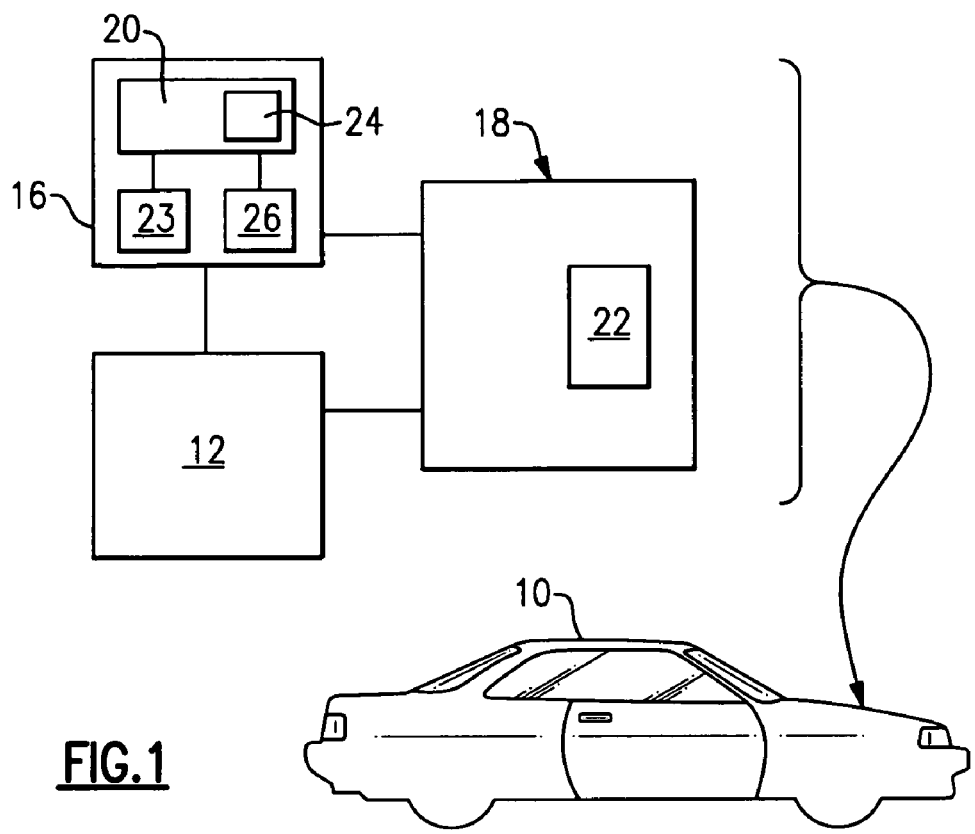
FIG. 1 is a schematic illustration of an example vehicle engine and intake manifold assembly using the sensor assembly of the present invention.

FIG. 1 illustrates a vehicle 10 having an engine 12 and an intake manifold system 16 connected to a fuel injection system 18. The intake manifold system 16 includes an engine actuator 20. The engine actuator 20 is typically mounted to the intake manifold 16 or in an area adjacent to the intake manifold 16. In the example shown the engine actuator 20 is located in a recess 54 (FIG. 3) formed in the intake manifold 16. An engine controller 22 within the fuel injection system 18 is connected to the engine actuator 20 to control air delivery to the engine 12.

The engine controller 22 directs the engine actuator 20 to operate valves 23 within the intake manifold 16 to modify the combustion in engine 12. In order to provide the engine 12 with a proper timing for fuel ignition the intake engine controller 22 requires information, such as the manifold air pressure and engine actuator 20 position. As the engine 12 speed and temperatures increases, airflow through the intake manifold 16 is also increased. When the speed and temperature of the engine 12 decrease, airflow through the intake manifold 16 is decreased. The engine actuator 20 adjusts valves inside the intake manifold 16 to optimize air delivery characteristics at different engine speeds by modifying air delivery parameters such as intake manifold tuning length or intake air tumble characteristics. A sensor assembly 26 provides the engine actuator 20 with feedback regarding the position and speed of the valves 23 within the intake manifold 16.

Although the sensor assembly 26 is described as measuring the position of an engine actuator 20 the sensor assembly 26 may be used in other applications where determining the position of a device is required.

Figure 2A:
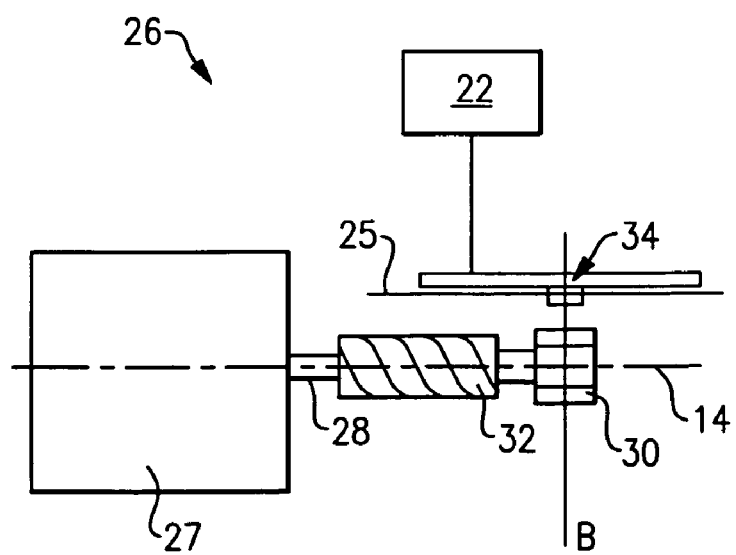
FIG. 2a is a schematic side view of an example sensor assembly of the present invention.
Figure 2B:
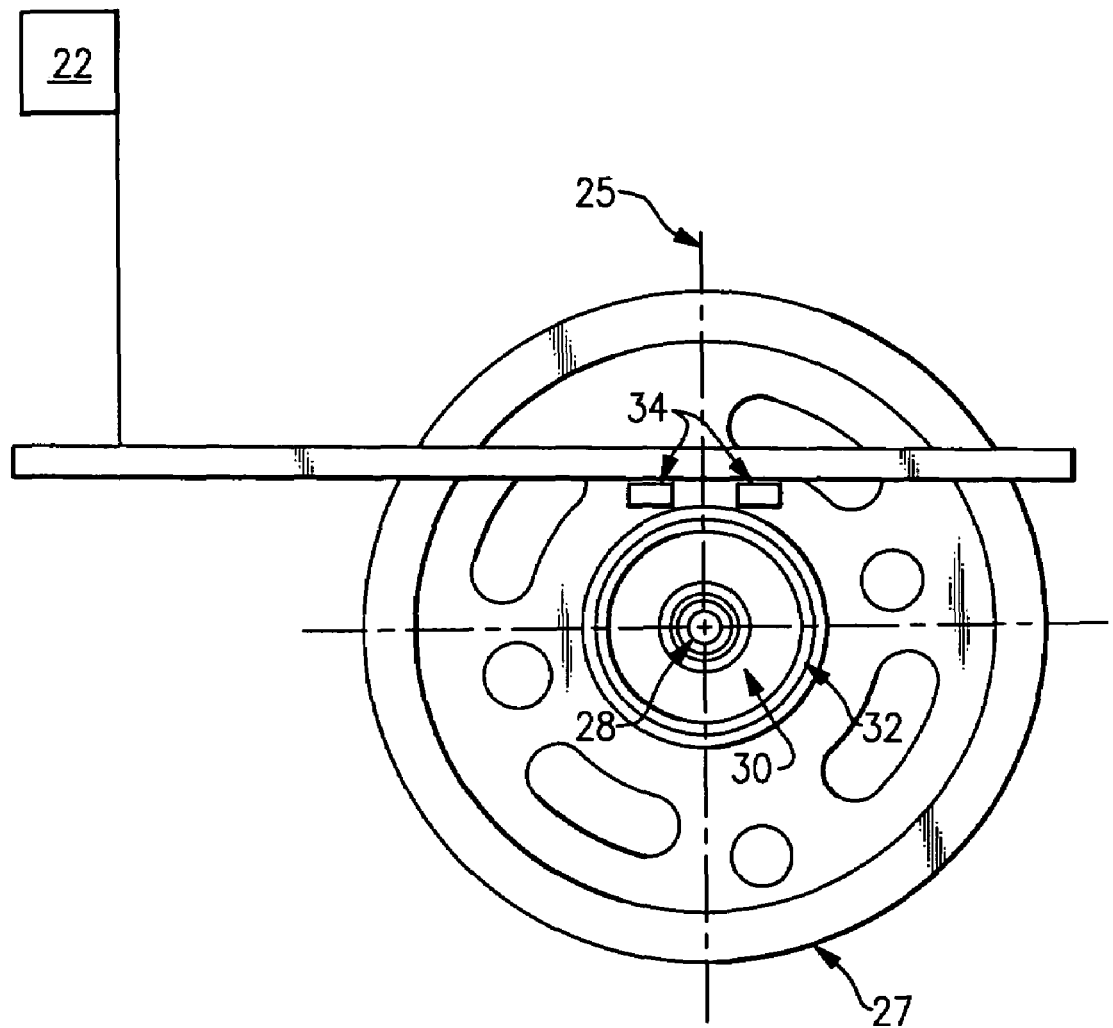

FIGS. 2a and 2b illustrates the sensor assembly 26 of the present invention. The sensor assembly 26 is connected to an electric motor 27 of the engine actuator 20. The electric motor 27 adjusts the location of the valves 23 within the intake manifold 16 through a gear train (not shown) and has an output shaft 28. A magnet 30 is mounted to the motor output shaft 28 and both the magnet 30 and motor output shaft 28 rotate about the same axis of rotation 14. In the example shown the magnet 30 is mounted to a worm gear 32 that is driven by the motor output shaft 28. Mounting the magnet 30 on the worm gear 32 provides an increased gear ratio, compared to the output shaft 48, for better resolution by the sensor assembly 26. Each rotation of the output shaft 48 rotates the magnet 30 multiple rotations. In the example, the output shaft 48 rotates once for every one-hundred rotations of the worm gear 32, and thereby the magnet 30. The sensor assembly 26 is an increment sensor in that the number of magnet 30 rotations are counted by the sensor assembly 26 to determine an accurate rotational position and speed of the output shaft 48. The example magnet 30 is a two-pole magnet.

First and second Hall effect sensors 34 are spaced from the magnet 30 and offset in opposite directions and an equal distance from plane 25. By using a two-pole magnet the axis 25 of the Hall effect sensors 34 can be parallel to the output shaft 28 and still be perpendicular to the magnetic field B created by the magnet 30, as required for desired operation of the Hall effect sensors 34. As the output shaft 28 rotates the Hall effect sensors 34 sense the rotation and direction of the magnet 30. Each half rotation of magnet 30 is counted and this information is collected by a microcontroller 24 in the engine actuator 20. The microcontroller 24 utilizes the position information to control location of the valves 23. Position information is also sent to the engine controller 22. The engine controller 22 interprets the position information and controls the fuel ignition system 18.

Because the Hall Effect sensors 34 are arranged parallel to the output shaft 28, less packaging room is required. Additionally, utilizing the two-pole magnet 30 provides an incremental sensor of reduced cost and space. The parallel arrangement of the Hall effect sensors 34 to the output shaft 28 requires only one Hall effect sensor 34 to obtain a clear reading of the rotation of the magnet 30. A second Hall effect sensor 34 is required to determine direction of rotation.

Figure 3:
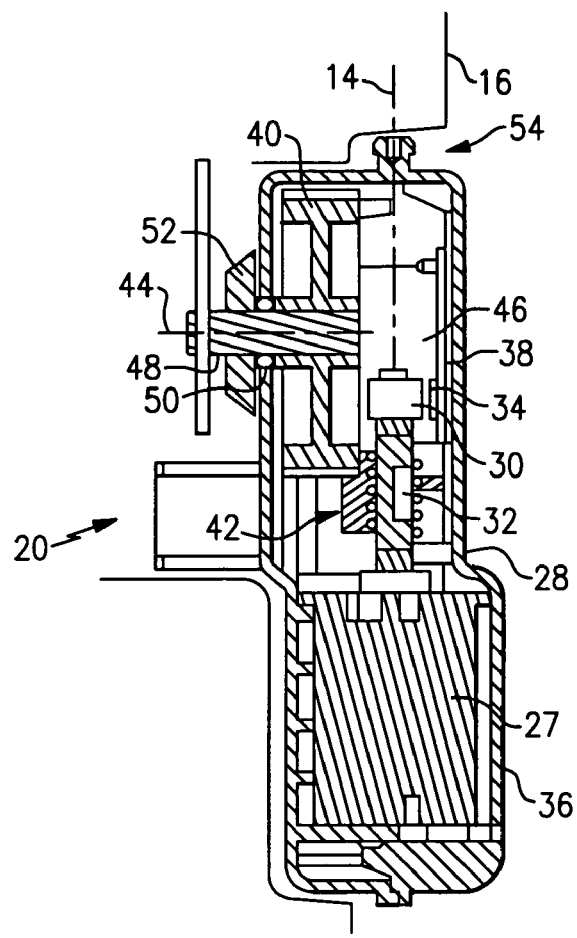
FIG. 3 is a cross-sectional view of an example engine actuator according to the present invention.

FIG. 3 illustrates the example engine actuator 20 including an actuator housing 36. A circuit board 38 is mounted to the actuator housing 36 and includes the Hall effect sensors 34 and the microcontroller 24 for the engine actuator 20. The Hall Effect sensors 34 are parallel to the axis of rotation 14 of the output shaft 28 and the worm gear 32. An output gear 40 is driven by the electric motor 27 through a gear train 42. The arrangement of the gear train 42 provides for the output gear 40 to rotate about an axis 44, perpendicular to the motor output shaft 28. The magnet 30 supported by the worm gear 32 is located in a space 46 between the circuit board 38 and the output gear 40.

The output gear 40 drives an output gear shaft 48 which both rotate about the axis 44. The output gear 40 is driven by the gear train 42 and connects the output gear shaft 48 to the gear train 42. Axial movement, of the output gear 40 along the axis of rotation 44 in a first direction away fro the housing 36 is controlled to protect the magnet 30 and circuit board 38 from being contacted by the output gear 40.

Figure 4:
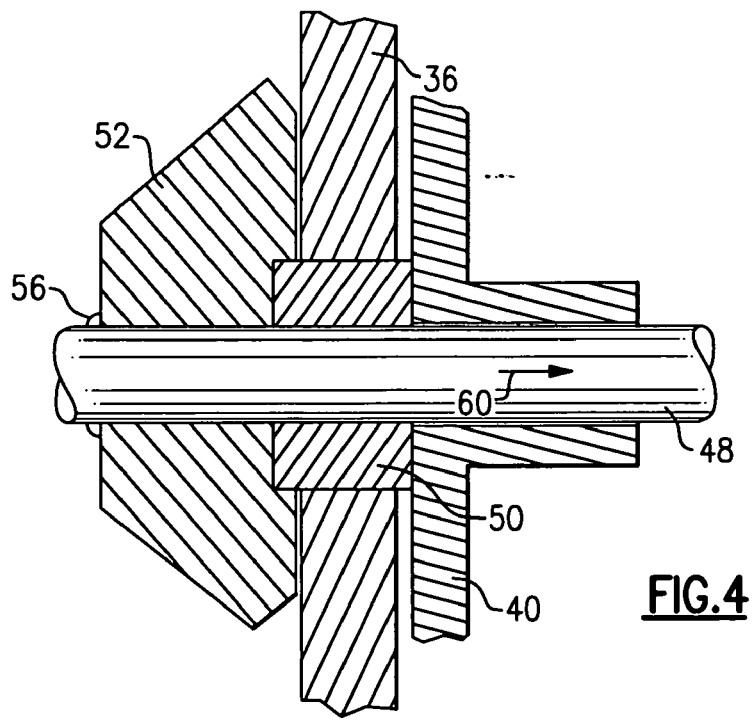
FIG. 4 is an enlarged view of an example output gear and output gear shaft according to the present invention.

FIG. 4 illustrates an enlarged view of the output gear 40 and the output gear shaft 48. A bearing 50 is mounted to the actuator housing 36 between the actuator housing 36 and the output gear shaft 48. The bearing 50 comprises a material to reduce friction between the bearing 50 and the output gear shaft 48 when the output gear shaft 48 is rotating. The bearing 50 provides the desired running fit with output gear shaft 48 that limits gear shake. A coupling 52 is mounted on the output gear shaft 48 outside the actuator housing 36. The coupling 52 is fixed to the output gear shaft 48 and rotates with the output gear shaft 48. The coupling 52 is preferably welded to the output gear shaft 48 as illustrated by the weld 56. During operation of the engine actuator 20 the coupling 32 contacts the actuator housing 36 to limit axial movement of the output gear shaft 48 in a first axial direction indicated by arrow 60. The output gear 40 contacts the bearing 50 and/or the actuator housing 36 to limit axial movement in a direction opposite the first direction indicated by arrow 60.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An engine actuator comprising:
    an electric motor located within an engine actuator housing;
    a sensor assembly driven by an output shaft of the electric motor through a worm gear;
    an output gear driven by the output shaft through a gear train such that the output gear rotates about an axis transverse to an axis of rotation of the sensor assembly.

2. The actuator of claim 1, wherein the output gear drives an output gear shaft and a coupling is located on the output gear shaft outside the actuator housing.

3. The actuator of claim 2, wherein a bearing is located between the output gear shaft and the actuator housing.

4. The actuator of claim 2, wherein the coupling and the output gear control axial movement of the output gear shaft.

5. The actuator of claim 2, wherein the coupling is welded to the output gear shaft.

6. The actuator of claim 1, wherein the sensor assembly includes a circuit board mounted to the actuator housing and facing the output gear.

7. The actuator of claim 6, wherein the sensor assembly includes a magnet rotatably connected the worm gear and located between the output gear and the circuit board.

8. The actuator of claim 7, wherein the actuator housing fits within a recess formed by an intake manifold housing.

9. An engine actuator comprising:
    an electric motor located within an engine actuator housing;
    a sensor assembly driven by an output shaft of the electric motor through a worm gear;
    an output gear supported on an output gear shaft and driven by the motor output shaft through a gear train such that the output gear rotates about an axis perpendicular to an axis of rotation of the sensor assembly; and
    a coupling mounted on the output gear shaft outside the actuator housing to control axial movement of the output gear shaft.

10. The actuator of claim 9, wherein the output gear drives the output gear shaft and the output gear shaft is limited from moving along the axis of rotation by the coupling and the output gear.

11. The actuator of claim 9, wherein a bearing is located between the output gear shaft and the actuator housing.

12. The actuator of claim 9, wherein the sensor assembly includes a circuit board mounted to the actuator housing and facing the output gear.

13. The actuator of claim 12, wherein the sensor assembly includes a magnet rotatably connected to the worm gear and located between the output gear and the circuit board.

14. The actuator of claim 9, wherein the actuator housing fits within a recess formed by an intake manifold housing.

15. The actuator of claim 9, wherein the coupling is fixed to the output gear shaft.

16. The actuator of claim 15, wherein the coupling is welded to the output gear shaft.

17. A method of limiting gear shake comprising:
    a) driving an output gear shaft with an output gear mounted on the output gear shaft;
    b) supporting the output gear shaft on an engine actuator housing with a bearing; and
    c) limiting axial movement of the output gear shaft with a coupling mounted to the output gear shaft outside the engine actuator housing.

18. The method of claim 17, wherein said step c) further includes limiting axial movement of the output gear shaft in a direction opposite the coupling with the output gear.

19. The method of claim 17, wherein said step a) further includes rotating a sensor assembly about an axis of rotation perpendicular to the axis of rotation of the output gear wherein at least a portion of the sensor assembly is located between the output gear and the actuator housing.

* * * * *